United States Patent [19]

Suzuki

[11] 4,062,807
[45] Dec. 13, 1977

[54] NITROGEN OXIDE REDUCING CATALYST

[75] Inventor: Kazuo Suzuki, Tokyo, Japan

[73] Assignee: Tokyo Shibaura Electric Co., Ltd., Kawasaki, Japan

[21] Appl. No.: 695,051

[22] Filed: June 11, 1976

[30] Foreign Application Priority Data

June 17, 1975 Japan .................................. 50-72672

[51] Int. Cl.² .................. B01J 27/20; B01J 35/00; C01B 31/30; B01J 8/00
[52] U.S. Cl. .................. 252/443; 252/477 R; 423/213.5; 423/239; 423/351
[58] Field of Search .................. 252/443, 477 R; 423/239, 351, 213.5

[56] References Cited

U.S. PATENT DOCUMENTS

| 1,946,109 | 2/1934 | Pier et al. | 252/443 X |
|---|---|---|---|
| 2,539,414 | 1/1951 | Frankenburg | 252/443 X |
| 2,755,228 | 7/1956 | Anhorn | 252/443 X |
| 3,180,840 | 4/1965 | Shotts | 252/443 |
| 3,865,750 | 2/1975 | Rose et al. | 252/443 |
| 3,949,057 | 4/1976 | Gilbert, Jr. | 423/239 |

FOREIGN PATENT DOCUMENTS 2,250,023  4/1973  Germany ............... 252/443

Primary Examiner—Patrick P. Garvin
Assistant Examiner—William G. Wright
Attorney, Agent, or Firm—Oblon, Fisher, Spivak, McClelland & Maier

[57] ABSTRACT

A nitrogen oxide reducing catalyst comprises a carrier made of at least one kind of metal selected from the group consisting of Ni, Co, Fe and an alloy made principally of two or more of these metals, and a carbide of at least one transition metal selected from the group consisting of Cr, Ti, Zr and V and carried by the carrier.

12 Claims, 12 Drawing Figures

NITROGEN OXIDE REDUCING CATALYST

BACKGROUND OF THE INVENTION

This invention relates to a nitrogen oxide reducing catalyst suitable for reduction to $N_2$ and $O_2$ of a nitrogen oxide ($NO_x$) in a gas exhausted from an internal combustion engine such as an automobile engine etc.

A gas exhausted from an internal combustion engine such as an automobile engine and gas turbine contains carbon monoxide (CO), nitrogen oxide ($NO_x$) and a hydrocarbon which is produced from an incomplete combustion. Of these, the nitrogen oxide per se is noxious and is provides a cause for air pollution, since the nitrogen oxide produces, for example, a harmful smog through a photochemical reaction after emission into the atmosphere. A solution to this problem has been attempted by, for example, a method for controlling an amount of $NO_x$ through fuel control and a method for converting the nitrogen oxide to innoxious components, i.e., $N_2$ and $O_2$, using a catalyst. The catalyst method has received a wide attention as an effective solution, since it is simpler from the practical view point than the fuel control method such as an air-fuel ratio control method, water spray method etc.

However, this catalyst method does not provide a satisfactory solution to the above-mentioned problem. A noble metal series catalyst, in particular, such as Pd, Pt, Au etc. has a strong tendency to produce a large amount of by-product ammonia ($NH_3$) in the reduction of $NO_x$ and the $NH_3$ is converted upon contact with an oxide catalyst to a nitrogen oxide, presenting a secondary air contamination. A catalyst of a metal oxide such as an alumina ceramic, ferrite etc. exhibits a relatively high stability at high temperature, but it suffers a performance deterioration due to a water or a water vapor (this is usually contained in an amount of 10 to 15% in an exhaust gas) included in an exhaust gas. For this reason, the catalyst can not effect a satisfactory reduction of $NO_x$ and nor can it be used for a longer period of time.

In reducing nitrogen oxide in the exhaust gas from the internal combustion to innoxious components by the catalyst method, the catalyst must have the following requirements:

a. it has an ability of completely reducing $NO_x$ to $N_2$ and $O_2$ b. it prevents production of ammonia even in coexistence with water, water vapor and hydrogen c. it exhibits high stability even at an exhaust gas temperature (usually 600° to 1000° C) and excellent resistance to oxidation and to corrosion.

Any known catalyst does not meet the above-mentioned requirements and for this reason the catalyst method has been used in combination with the fuel control method in reducing the $NO_x$ in the exhaust gas to innoxious elements.

SUMMARY OF THE INVENTION

It is accordingly the object of this invention to provide a $NO_x$ reducing catalyst excellent in resistance to heat and corrosion, which is capable of withstanding a violent mechanical vibration and always performing the function of converting $NO_x$ to $N_2$ and $O_2$.

A nitrogen oxide reducing catalyst according to this invention comprises a carrier made of at least one kind of metal selected from the group consisting of Ni, Co, Fe and allow made principally of two or more of these metals, and a carbide of at least one transition metal selected from the group consisting of Cr, Ti, Zr and V.

BRIEF DESCRIPTION OF THE DRAWING

This invention will be further described by way of example by referring to the accompanying drawings in which.

Figure 1:
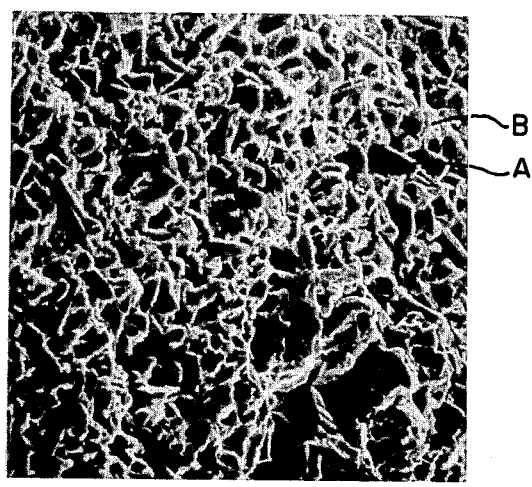
FIG. 1 is a photograph, taken by a scanning electron microscope, showing by way of example the surface state of a nitrogen oxide reducing catalyst according to one mebodiment of this invention.

A nitrogen oxide reducing catalyst according to this invention comprises at least one kind of carriers selected from the group consisting of Ni, Co, Fe and an alloy having two or more kinds of these metals as a main component, and a carbide of at least one transition metal selected from the group consisting of Cr, Ti, Zr and V which is carried by the carrier.

This invention will now explained more in detail below.

According to a preferred example of this invention a nitrogen oxide reducing catalyst comprises at least one kind of carrier selected from the group consisting of Ni, Co, Fe and an alloy having two or more kinds of these metals as a main component, and a carbide of at least one transition metal selected from the group of Cr, Ti, Zr and V carried by a carrier, and constitutes a sintered body having the carbide particles projected on the surface.

According to another preferred example of this invention a nitrogen oxide reducing catalyst comprises at least one kind of skeleton selected from the group consisting of Ni, Co, Fe and an alloy having two or more kinds of these metals and a carbide of at least one transition metal selected from the group consisting of Cr, Ti, Zr and V which is sintered on and carried by the skeleton.

These two type of nitrogen oxide reducing catalyst will be explained in this order.

The reducing catalyst of the sintered body having the carbide particles projected on the surface is manufactured by sintering at more than 1250° C a shaped body of the above-mentioned transition metal-carbide powder having 10 to 40 wt.% of the above-mentioned carrier, and treating the sintered body with an acid solution to cause the carrier exposed on the surface of the sintered body to be selectively removed to permit the surface of the sintered body to be projected.

A powdered carbide ($Cr_3C_2$, $Cr_7C_3$, TiC, ZrC, VC) of a transition metal with an average particle size of about 5 to 6 $\mu$ and a powder of Co, Ni, Fe or an alloy made of two or more kinds of these metals are prepared as raw material powders, with the latter powder having a particle size of 100 to 325 meshes. The latter metal or alloy serves as a binder phase for the sintered body and will be hereinafter referred to as a binder phase. The powdered carbide and powdered bonding agent are mixed in a predetermined ratio (powdered carbide: 60 to 90 wt.%; powdered bonding agent: 10 to 40 wt.%) to obtain a raw material powder. The raw material powder can also be prepared according to the following method. That is, the above-mentioned powder mixture is sintered in a neutral atmosphere at a liquid-phase sintering temperature to form a $\sigma$ phase in the sintered mass, followed by pulverizing it. The powdered mixture is formed into a shaped body followed by sintering at a temperature of 1250° C. Though the sintering is effected under atmospheric pressure, it is preferably conducted under vacuum pressure so as to obtain a catalyst excellent in properties. At the sintering temperature above 1250° C the powdered carbide is abnormally grown and the axial ratio of the particle, i.e., the ratio of the long axis and short axis of the particle, will be in a range of 2 to 5. The sintered body so obtained is immersed in an acid solution, such as an aqueous hydrochloric acid solution, concentrated hydrochloric acid solution, aqueous nitric acid solution or concentrated nitric acid solution, to selectively remove the surface of the sintered body, while heating it if necessary. It is thus possible to obtain a reducing catalyst for a nitrogen oxide ($NO_x$) which has the particles of the carbide projected over the whole surface of the sintered mass. The reason why the sintering temperature is restricted to more than 1250° C is as follows:

The carbide particles, if heated at more than 1250° C, are abnormally grown so that the axial ratio of the particle is in a range of 2 to 5. Therefore, even when the binder phase near the surface of the sintered body is removed by the acid solution to permit the carbide particles to be projected, the carbide particle is enough embedded in the sintered body, thereby preventing the carbide particle from being dropped off the surface of the sintered body.

Figure 2:
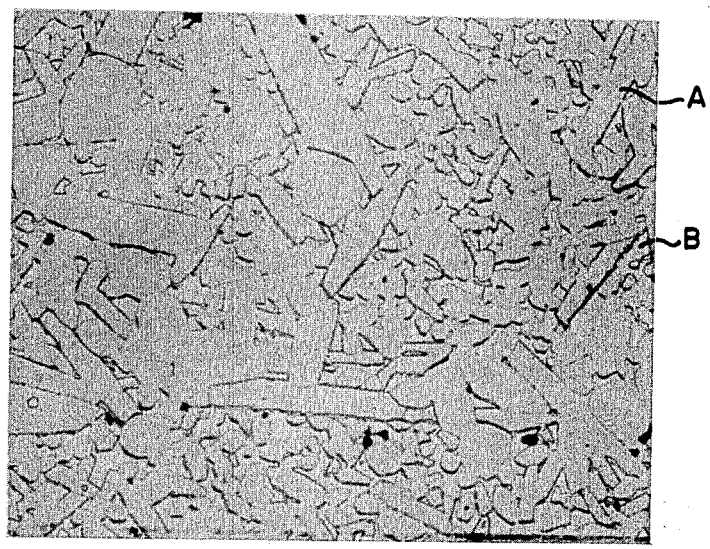
FIG. 2 is a photomicrograph showing the cross-sectional structure of a sintered body before the acid treatment of the catalyst in FIG. 1.

FIG. 1 shows a photograph (magnification: X1000), taken by a scanning electron microscope, showing the surface state of a $NO_x$ reducing catalyst of a sintered mass with chromium carbide particles projected which was manufactured by the above-mentioned method. FIG. 2 shows a microscopic photograph (magnification: X500) showing cross-sectional structure before treatment of the catalyst in FIG. 1 by the acid solution. In these Figures, A represents chromium carbide particles and B represents a Ni phase or a Ni-alloy phase.

Figure 3:
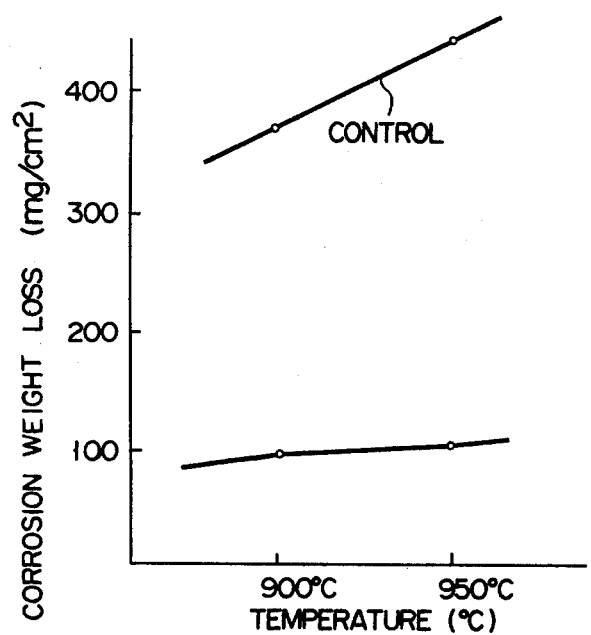
FIG. 3 is a graph showing, in comparison with a WC-CO system catalyst, the corrosion weight loss of the catalyst in FIG. 1 by a PbO attack.
Figure 4:
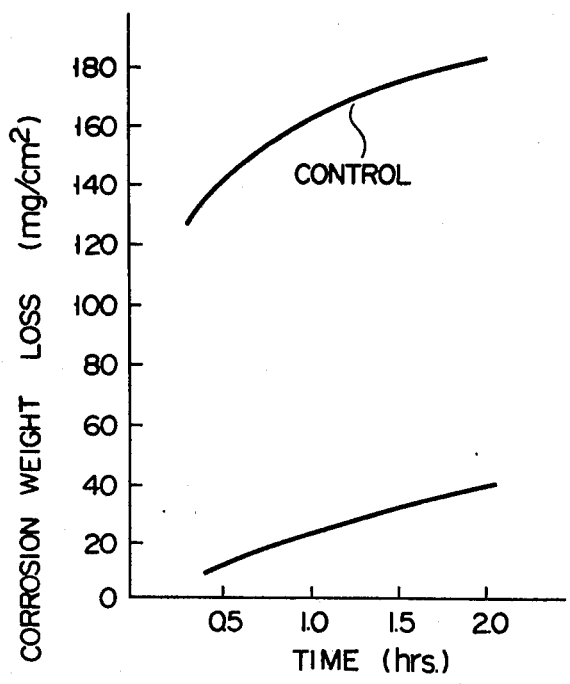
FIG. 4 is a graph showing, in comparison with a WC-Co system catalyst, the corrosion weight loss of the catalyst in FIG. 1 by a $V_2O_5$ attack.

As already set out above, the carbide particle, when sintered at more than 1250° C, is not dropped or peeled off the surface of the sintered body. Such sintered catalyst has a high mechanical strength and can hold its own shape or structure even when a mechanical shook or vibration is applied to the sintered body. It also performs an excellent catalytic action due to its irregularly indented wide surface are resulting from treatment by the acid solution. Since the carbide ($Cr_3C_2$, $Cr_7C_3$, TiC, ZrC, VC) has excellent resistance to heat and corrosion as well as excellent resistance to corrosion at high temperature, the catalyst including such carbides, even when exposed to hot exhaust gases (600° to 1000° C) from an automobile etc., is neither attached nor deteriorated, and it performs a predetermined function. FIG. 3 shows a corrosion weight loss due to a PbO attack resulting from an exhaust gas of, for example, an automobile engine and FIG. 4 shows a corrosion weight loss due to a $V_2O_5$ attack resulting from an exhaust gas of an internal combustion engine such as a gas turbine in which a low quality heavy oil is used as a fuel. FIGS. 3 and 4 show, as controls, results obtained by using a known $NO_x$ reducing catalyst consisting of a WC-Co system sintered body including 15 weight percent of Co. As will be evident from FIGS. 3 and 4, the catalyst according to this invention shows excellent corrosion resistance. This is due to the fact that the surface of the catalyst is covered by a carbide ($Cr_3C_2$, $Cr_2C_7$, TiC, ZrC, VC) having excellent corrosion resistance. The carrier (Ni, Co, Fe and an alloy consisting of two or more of these metals) always maintains excellent catalytic ability of the carbide. The catalyst undergoes little aging and, even when the catalytic ability of the catalyst is lowered, it is readily recovered by an acid solution re-treatment.

As already shown, the $NO_x$ reducing catalyst according to this invention, which has the carbide particles projected over the whole surface thereof, has excellent resistance to heat and corrosion and high mechanical strength and always exhibits excellent catalytic ability.

Explanation will now be made of a preferred method for manufacturing a $NO_x$ reducing catalyst consisting of a skeleton structure and a transition metal carbide carried by the skeleton structure.

Figure 5:
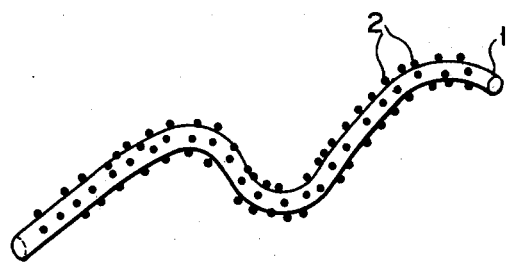
FIG. 5 is an enlarged model diagram partly showing an element which constitutes a nitrogen oxide reducing catalyst according to another embodiment of this invention.
Figure 6:
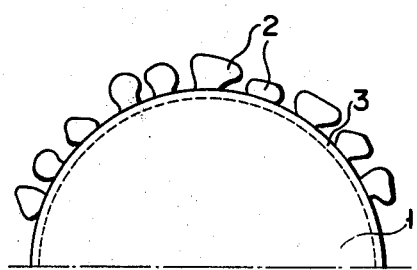
FIG. 6 is an enlarged cross-sectional view showing the element in FIG. 5.

A skeleton structure is formed of a metal in the form of fine wires or shavings which is selected from the group consisting of Ni, Co, Fe and an alloy consisting mainly of two or more of these metals and has an average diameter of 10 to 5000 $\mu$. It is preferred that the skeleton structure be formed into a predetermined catalytic shape. A suspension is prepared by suspending in a proper dispersion medium a powdered or granulated carbide (an average particle size of 1 to 10 $\mu$) of at least one transition metal selected from the group consisting of Cr, Ti, Zr and V. The skeleton structure is immersed in the suspension and dried after removal. The carbide particle is attached over the whole surface of the skeleton structure. The skeleton structure is heated in vacuum or in an inert gas atmosphere to a temperature of 1000° C to obtain a catalyst having the carbide particle sintered on and carried by the skeleton structure. FIG. 5 shows an enlarged model diagram of an element constituting a $NO_x$ reducing catalyst so obtained. FIG. 6 is an enlarged cross-sectional view of the model. In FIGS. 5 and 6 the carbide particles 2 are attached on the surface of the element of the skeleton structure and a sintered alloy layer is formed between the skeleton structure 1 and the carbide particle 2. As will known in the art, the catalytic ability bears a close relation to a surface area (specific surface area) of the catalyst. In the $NO_x$ reducing catalyst it is desired that the diameter of an element constituting the skeleton structure, as well as the particle size of the carbide, be made as small as possible. If, however, the element and the carbide particle have a very small diameter, an excess surface energy is involved, promoting an oxidation reaction and making it liable to cause a performance deterioration. If on the other hand the element and the carbide particle have too great a diameter, the surface area of the catalyst is made too small and thence a catalytic performance is substantially tantamount to that of a spherical catalyst packed bed. In the $NO_x$ reducing catalyst according to this inventiion, therefore, the average diameter of the element of the skeleton structure is preferred to be in a range of 10 to 5000 $\mu$, the relative density of the skeleton structure is to be in a range of 5 to 50% and the average size of the carbide particle is to be in a range of 1 to 10 $\mu$. Table 1 shows a relation of a diameter D ($\mu$) to a specific area As ($cm^2/g$) of the element constituting the skeleton structure.

Table 1

| Diameter of the skeleton structure element D ($\mu$) | Specific surface area As ($cm^2/g$) |
| --- | --- |
| 5 | 1025.6 |
| 10 | 512.8 |
| 20 | 256.4 |
| 40 | 128.2 |
| 80 | 64.1 |
| 100 | 51.3 |
| 200 | 25.6 |
| 400 | 12.8 |
| 500 | 10.3 |
| 1000 | 5.1 |
| 5000 | 1.0 |
| 10000 | 0.5 |
| 50000 | 0.1 |

The carbide ($Cr_3C_2$, $Cr_7C_3$, TiC, ZrC, VC) is high in melting point, stable even at high temperature and excellent in resistance to corrosion and oxidation. Since the skeleton structure heated to form an alloy layer together with the carbide particle, a resistance to oxidation as well as a resistance to corrosion at high temperature is imparted to the skeleton structure per se. Therefore, $NO_x$ reducing catalyst according to this invention has excellent resistance to corrosion and oxidation and always performs excellent reducing function with respect to $NO_x$ in the exhaust gas.

As will be understood from the above explanation, the $NO_x$ reducing catalyst according to this invention is high in mechanical strength and excellent in resistance to heat and corrosion and always performs the function of effectively converting $NO_x$ to $N_2$ and $O_2$.

Examples of this invention will be explained below. In Examples 1 and 2 a $NO_x$ reducing catalyst is shown which is a sintered body having carbide particles projected over the surface thereof. In Examples 3 and 7 a $NO_x$ reducing catalyst is shown which consists of a skeleton structure and a carbide of a transition metal sintered on and carried by the skeleton structure.

EXAMPLE 1

Figure 7:
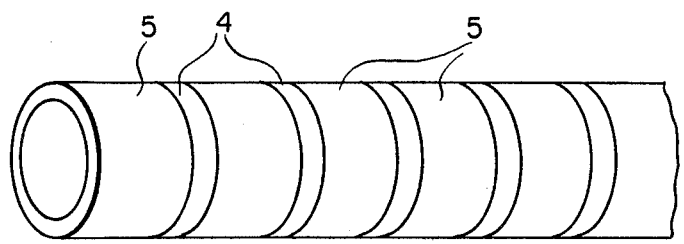
FIG. 7 is a perspective view showing one example of the catalyst in FIG. 1.
Figure 8:
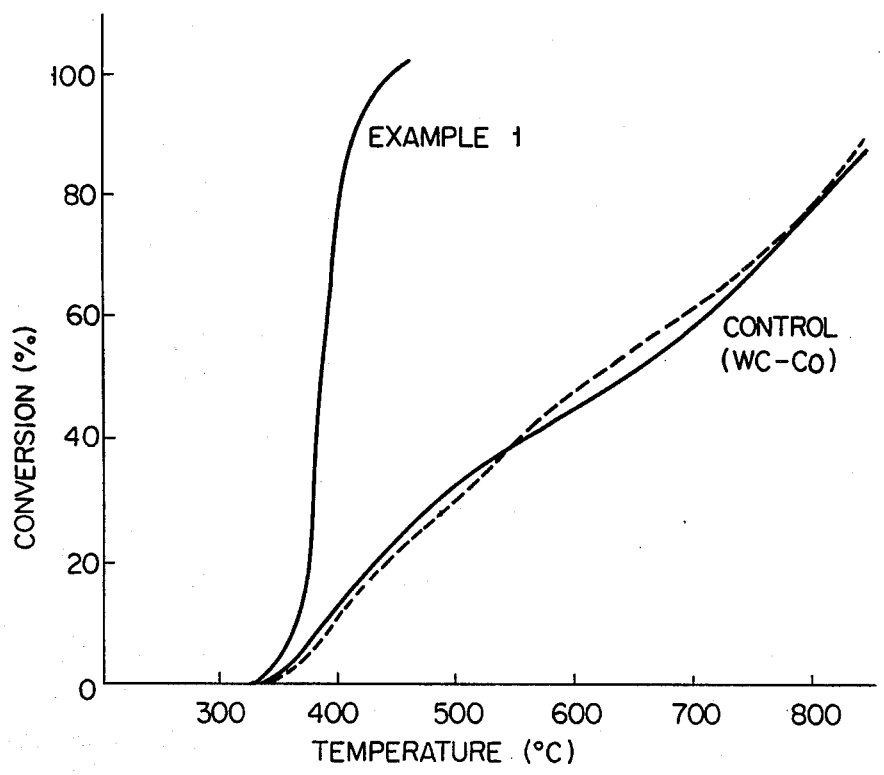
FIG. 8 is a graph showing, in comparison with a WC-Co system catalyst, a relation of a converting temperature to the convertion percentage of nitrogen oxide by the catalyst in FIG. 1.

A mixture of 80 weight percent of a chromium carbide powder with an average particle size of 5 to 6 $\mu$ and 20 weight percent of a reduced nickel powder with a particle size of $-325$ mesh and acetone were milled for 72 hours at a wet type ball mill while adding acetone and evaporated the acetone to obtain a mixed powder. After adding 1.5 weight percent of paraffin to the mixed powder, a bored disc with a diameter of 30 mm and a thickness of 5 mm and a cylinder with an inner diameter of 20 mm, an outer diameter of 30 mm and a length of 20 mm were compacted at a pressure of 2 tons/$cm^2$. The green compact was pre-sintered in a high purity hydrogen gas atmosphere at 700° C for 1 hour. The discs and cylinders were alternately placed to obtain a cylinder assembly with a whole length of 250 to 300 mm and the cylinder assembly was sintered at 1350° C for 2 hours in a vacuum furnace. FIG. 7 shows the so sintered cylinder assembly in which the discs 4 and cylinders 5 are alternately bonded together. The sintered cylinder assembly was immersed for three hours in a boiling concentrated hydrochloric acid to selectively remove exposed Ni phases. As a result, a $NO_x$ reducing catalyst was obtained. The catalyst had such a surface, as shown in FIG. 1, with a dented depth of 20 to 50 $\mu$. The $NO_x$ reducing catalyst was mounted in a stainless steel cylinder of AISI 304 to assemble a $NO_x$ reducing converter. The converter was externally heated so as to raise a temperature at constant rate. A NO containing gas flowed through the converter and the gas from the converter was analyzed by a gas chromatography, the result of which is shown in FIG. 8. Note that the composition of the NO containing gas is as follows:

CO — 5000 to 10000 ppm
NO — 500 to 1000 ppm
$O_2$ — 20 to 50 ppm

For comparison, a catalyst consisting of a WC-Co system sintered body manufactured in the same method was tested in a similar way, the result of which is indicated in a dotted line in FIG. 8. Note that a solid line (control) in FIG. 8 indicates a result obtained from a sintered body before a hydrochloric treatment is effected.

The above-mentioned $NO_x$ reducing converter was mounted on an automobile and a running test was conducted with no inconvenience result.

A $NO_x$ containing gas heated to 470° C was passed through the $NO_x$ reducing converter and after the lapse of 200 hours a conversion of NO to $N_2$ and $O_2$ was evaluated. The degree of conversion was compared with an initial value and the performance deterioration was found to be only $-3\%$. The catalyst heated for 200 hours was immersed for 1.5 hours in a boiling hydrochloric acid and it was found that the catalytic ability is recovered to an initial value.

EXAMPLE 2

A $NO_x$ reducing catalyst was manufactured from a mixed powder consisting of a chromium carbide powder with an average particle size of 5 to 6 $\mu$ and metal powders with a particle size of $-100$ mesh and having a composition ratio shown in Table II. In the Table the first step shows sintering conditions in vacuum and the second step shows a treatment by a boiling hydrochloric acid.

Table III shows a relation of a temperature to a mechanical strength, the axial ratio of chromium carbide and the conversion percentage of the $NO_x$ gas. As will be evident from Table III the $NO_x$ reducing catalyst according to this invention has excellent mechanical strength and excellent catalytic ability.

Table II

| Sample | Material composition (wt.%) | | | | | | First step | Second step |
|---|---|---|---|---|---|---|---|---|
| | $Cr_3C_2$ | Fe | Ni | Co | Cr | Mo | | |
| A | balance | — | 10 | — | — | — | 1350° C, 2 hrs, vac | 86° C HCl, 3hrs |
| B | " | — | 30 | — | — | — | 1250° C, 2hrs, vac | " |
| C | " | 15 | — | — | — | — | 1400° C, 2hrs, vac | " |
| D | " | — | — | 15 | — | — | 1300° C, 2hrs, vac | " |
| E | " | 15.2 | 1.6 | — | 3.6 | — | 1350° C, 2hrs, vac | " |
| F | " | — | — | 18 | 2 | — | 1400° C, 3hrs, vac | " |
| G | " | 19.5 | 2.0 | — | 4.5 | 0.3 | 1400° C, 3hrs. vac | " |
| H | " | 8.3 | 16.5 | — | — | — | 1350° C, 2hrs, vac | " |
| I | " | — | 18 | — | 2 | — | 1350° C, 3hrs, vac | " |
| J | " | 24 | — | — | 2 | — | 1400° C, 2hrs, vac | " |

Table III

| Sample | Mechanical strength | | Axial ratio of $Cr_3C_2$ particles | Conversion percentage of $NO_x$ gas and reaction temperature | | |
|---|---|---|---|---|---|---|
| | HRA* | TRS** | | 5% conversion temp. (°C) | 50% conversion temp. (°C) | 100% conversion temp. (°C) |
| A | 78.5 | 85 | 3 | up to 350 | 400 | 480 |
| B | 77.6 | 113 | 7 | up to 340 | 370 | 408 |
| C | 75.4 | 73 | 4 to 5 | up to 340 | 420 | 450 |
| D | 79.7 | 92 | 6.4 | up to 330 | 380 | 400 |
| E | 76.3 | 103 | 3.2 | up to 350 | 450 | 480 |
| F | 77.6 | 94 | 4.6 | up to 370 | 400 | 450 |
| G | 79.4 | 115 | 2.8 | up to 360 | 420 | 480 |
| H | 78.2 | 77 | 5.3 | up to 380 | 390 | 420 |
| I | 76.3 | 98 | 6.1 | up to 350 | 370 | 405 |
| J | 75.9 | 82 | 3.8 | up to 380 | 440 | 478 |

Note:
*Hardness of Rockwell A scale
**Transverse rupture strength (Kg/mm²)

EXAMPLE 3

Figure 9:
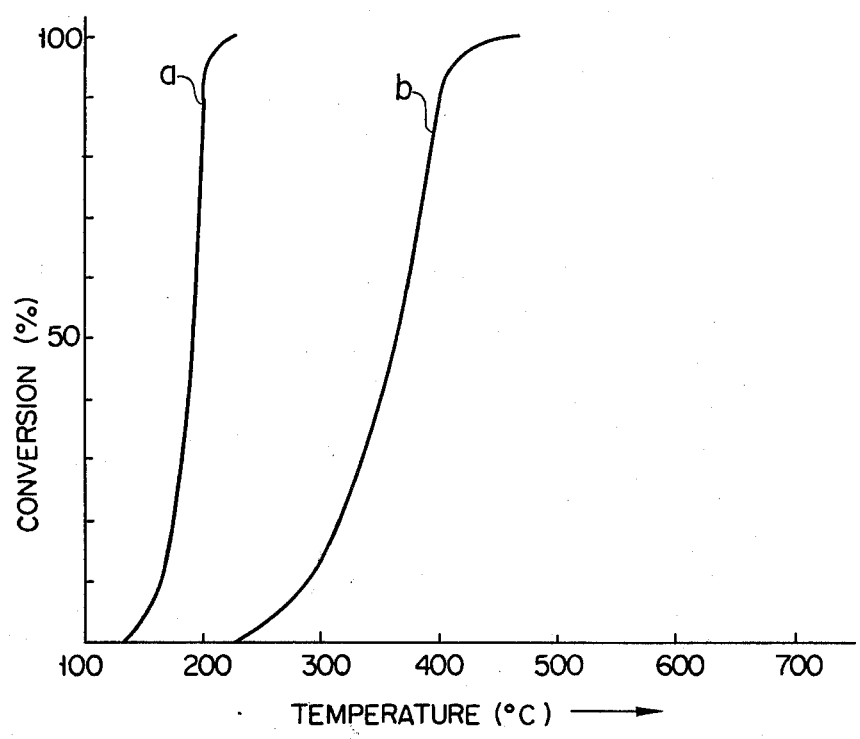
FIG. 9 and 12 are graphs showing a relation of a converting temperature to the convertion percentage of nitrogen oxide by a catalyst made of the element in FIG. 5.

150 g of a Ni wire (Ni + Co≧298.5 wt.%) with an average diameter of 500 μ was inserted in a skeleton fashion into a stainless steel pipe and compressed to obtain a skeleton structure with a relative density of about 15%. On the other hand, 20 parts by weight of a chromium carbide powder with an average particle size of 5 to 6 μ was dispersed in 80 parts by weight of 10% sugar solution to obtain a suspension. One end of the stainless steel pipe was temporarily sealed by a flange, the suspension was filled into the stainless steel pipe and with stirring chromium carbide particles were deposited onto the surface of the Ni wire. After removing the suspension and detaching the flange from the pipe the skeleton was dried at 70° C for 1.5 hours with the skeleton kept within the stainless steel pipe. After drying, a stainless steel pipe was placed within a vacuum furnace with the skeleton kept within the stainless steel pipe and the furnace was evacuated to a vacuum of $10^{-4}$ to $10^{-5}$ mm Hg. The stainless steel pipe was heated at a rate of 300° C/Hr and a sintering treatment was carried out for one hour at 1250° C. As a result, carbide particles was sintered on, and carried by, the Ni wire to obtain a $NO_x$ reducing converter in which a skeleton-like catalyst was diffused on the wall surface of the stainless stell pipe. The performance test of the $NO_x$ reducing converter was carried out as in Example 1. That is, the converter was externally heated at constant rate and a NO containing gas having the same composition as in Example 1 was passed through the converter. The gas from the converter was analyzed by a gas chromatography and a relation of the $NO_x$ gas conversion percentage (reduction percentage) to the converting temperature was found out, the result of which was indicated by a curve a in FIG. 9.

The same test was conducted except that 50 g of a Fe wire with an average diameter of 50 μ was used in place of the Ni wire and a sintering treatment was carried out for 30 minutes at 1300° C. In this case, the excellent performance of the $NO_x$ reducing converter was exhibited as indicated by a curve b in FIG. 9.

EXAMPLE 4

Figure 10:
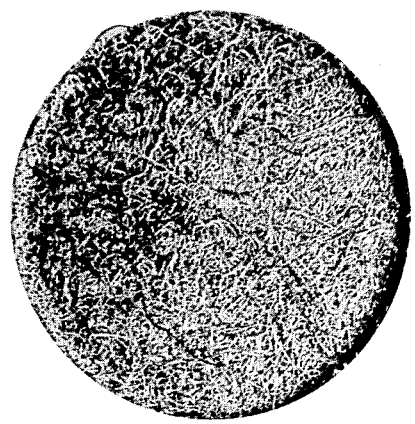
FIG. 10 is a microscope photograph of a skeleton structure which serves a base for the catalyst made of the element in FIG. 5.
Figure 11:
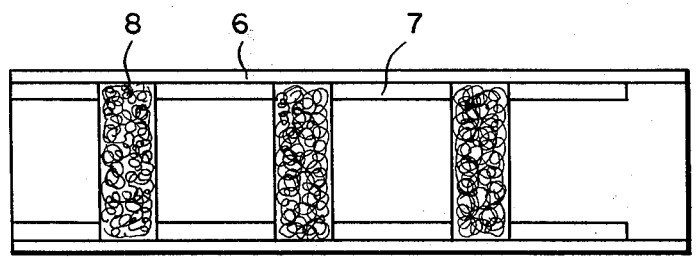
FIG. 11 is a cross-sectional view showing a convereor in which the catalyst made of the element body in FIG. 5 is incorporated.

25 g of a Ni wire with an average diameter of 500 μ was charged in a metal mold and a pressure of 1 to 2 tons/cm² was applied to obtain a disc-like skeleton structure with a thickness of 6 mm, a diameter of 40 mm and a relative density of 35 to 40%. FIG. 10 shows a microscopic photograph (magnification: × 1.5) of the skeleton structure. The disclike skeleton structure was immersed in a suspension, in which $Cr_3C_2$ with an average particle diameter of 4 to 5 μ was dispersed in alcohol, thus depositing $Cr_3C_2$ particles on the surface of the skeleton structure. After drying the skeleton structure, it was placed within a vacuum furnace and an evacuation was effected. The skeleton structure was heated at a rate of 300° C/hr and sintered for 1.5 hours at 1200° C. As a result, a skeleton-like $NO_x$ reducing catalyst was obtained. As shown in FIG. 11 the $NO_x$ reducing catalyst 8 are placed through a fixed ring 7 into an AISI 304 stainless steel pipe to assembly a $NO_x$ reducing converter and a relation of a converting temperature to the conversion percentage (reducing percentage) of the $NO_x$ gas was obtained under the same condition as in Example 3, showing good result.

EXAMPLE 5

50 g of an AISI 304 stainless steel cutting chips with an average diameter of 150 μ was charged into a metal mold and a pressure of 4 to 5 tons/cm² was applied to the shavings to obtain a disc-like skeleton structure with a relative density of 30 to 32%. The skeleton structure was immersed in the same suspension as in Example 3 and an ultrasonic vibration was externally applied to the skeleton structure to deposite $Cr_3C_2$ particles on the skeleton structure. The deposited skeleton structure, after removed, was dried. An amount of $CR_3C_2$ particles deposited was about 5 to 30 weight percent of the skeleton structure.

Figure 12:
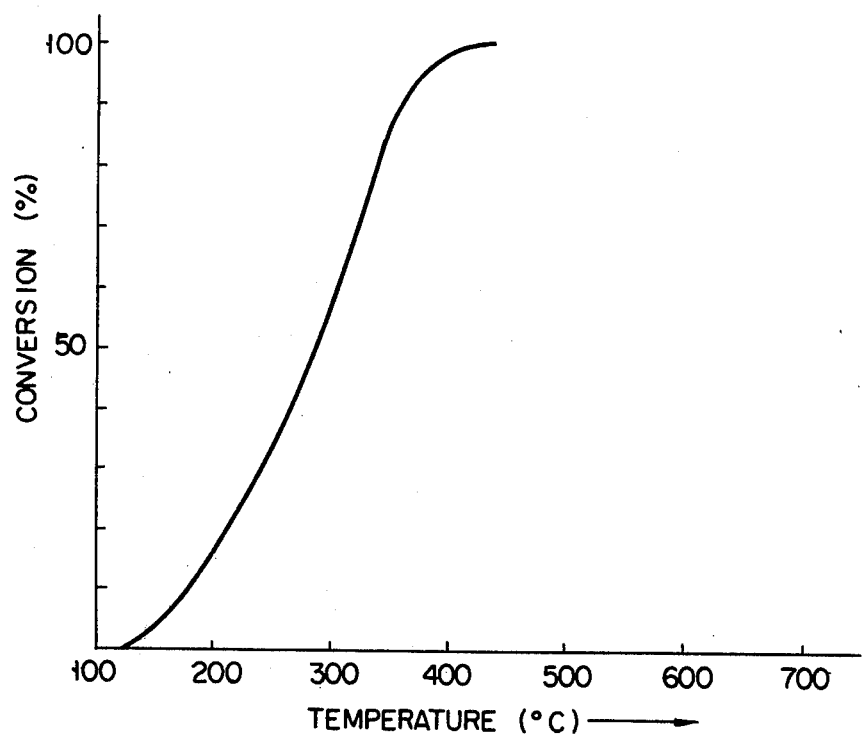

After drying, the skeleton structure was heated for 2 hours at 1300° C in a vacuum furnace and a $NO_x$ reducing catalyst, in which $Cr_3C_2$ particles was sintered on and carried by the skeleton structure, was obtained. As in Example 4, a $NO_x$ reducing converter was assembled using the reducing catalyst and a relation of a converting temperature to the convertion percentage (reduction percentage) of the $NO_x$ gas was obtained under the same condition as in Example 3, the result of which was shown in FIG. 12.

EXAMPLE 6

A $NO_x$ reducing catalyst was obtained as in the case of Example 3, using carbide particles and an element of a skeleton structure, shown in Table IV. The performance of the reducing catalyst was evaluated under the same condition as in Example 3, the result of which are tabulated in Table V.

Table IV

| | Carbide particles | | Skeleton structure material | | Sintering condition | |
|---|---|---|---|---|---|---|
| Sample | Kind | Average particle size D (μ) | Kind | Average diameter Dm (μ) | temperature (° C) | time (hr) |
| A | $Cr_3C_2$ | 5 to 6 | Co wire | 500 | 1250 | 1.5 |
| B | $Cr_3C_2$ | " | Ni-Cr wire | 500 | 1300 | 2.0 |
| C | TiC | 4 to 5 | Ni wire | 1000 | 1300 | 1.0 |
| D | TiC | " | Fe-Cr-Al wire | 500 | 1300 | 2.0 |
| E | TiC | " | AISI 304 shavings | 300 to 400 | 1250 | 2.0 |
| F | ZrC | " | Ni wire | 500 | 1250 | 2.0 |
| G | ZrC | " | Ni-Cr wire | 500 | 1250 | 3.0 |
| H | VC | 6 to 8 | Ni wire | 1000 | 1200 | 2.0 |
| I | VC | " | Ni wire | 500 | 1200 | 1.5 |
| J | VC | " | Fe-Cr-Al wire | 500 | 1250 | 1.5 |

Table V

| | Relative density of skeleton structure (%) | $NO_x$ gas conversion percentage and reaction temperature | | |
|---|---|---|---|---|
| Sample | | 5% conversion temp. (° C) | 50% conversion temp. (° C) | 100% conversion temp. (° C) |
| A | 28.5 | up to 375 | 400 | 435 |
| B | 32.4 | up to 350 | 380 | 420 |
| C | 25.6 | up to 340 | 400 | 430 |
| D | 36.7 | up to 370 | 400 | 450 |
| E | 33.4 | up to 370 | 420 | 460 |
| F | 8.9 | up to 360 | 390 | 450 |
| G | 27.8 | up to 370 | 400 | 440 |
| H | 12.6 | up to 280 | 305 | 380 |
| I | 30.5 | up to 250 | 290 | 340 |
| J | 27.4 | up to 305 | 345 | 390 |

EXAMPLE 7

100 g of a Ni wire with an average diameter of 250 μ was inserted in a stainless steel pipe with an inner diameter of 30 mm, a length of 170 mm and a thickness of 3 mm and a pressure was applied to the Ni wire to obtain a skeleton structure. A suitable adhesive is spray coated on the skeleton structure and powdered chromium carbide with an average particle size of 5 to 6 μ was deposited on the coated skeleton structure. The skeleton structure was pre-heated in a high purity argon gas stream at 900° C for three hours and then heated under a vacuum of $10^{-4}$ to $10^{-5}$ mm Hg at 1270° C for 2 hours, causing the chromium carbide particles to be sintered on and carried by the skeleton structure and obtaining a $NO_x$ reducing catalyst in which the chromium carbide particles were uniformly deposited onto the skeleton structure. The catalyst exhibits excellent performance as in Examples 3 to 6.

What is claimed is:

1. A nitrogen oxide reducing catalyst produced by the process which comprises:
   a. immersing a metal skeleton structure in a suspension prepared by suspending in a dispersion medium carbide particles of at least one transition metal selected from the group consisting of Cr, Ti, Zr, and V to attach said carbide particles to the surface of said skeleton, wherein said skeleton comprises at least one metal selected from the group consisting of Ni, Co, Fe and an alloy mainly comprised of at least two of these metals, and
   b. sintering the combination of said skeleton and said attached carbide particles so as to sinter said carbide particles onto said skeleton.

2. The nitrogen oxide reducing catalyst of claim 1, wherein said carbide particles have an average particle size of 1 to 10 μ.

3. The nitrogen oxide reducing catalyst according to claim 1 in which said skeleton structure consists of an element with an average diameter of 10 to 5000 μ.

4. The nitrogen oxide reducing catalyst according to claim 3 in which said element of said skeleton structure is a wire.

5. The nitrogen oxide reducing catalyst according to claim 3 in which said element of said skeleton structure is cutting chips.

6. The nitrogen oxide reducing catalyst according to claim 1 in which a relative density of said skeleton structure is 5 to 50%.

7. A method for manufacturing a nitrogen oxide reducing catalyst comprising the steps of
   a. sintering a powder compact comprising at least one kind of powdered bonding agent selected from the group consisting of Ni, Co, Fe and an allow mainly made of at least two of these metals, and a carbide of at least one transition metal selected from the group consisting of Cr, Ti, Zr and V, to obtain a sintered body;
   b. subjecting said sintered mass to an acid solution to partially remove said bonding agent from the surface of said sintered body.

8. The method according to claim 7, in which said powder compact comprises 10 to 40 weight percent of powdered bonding agent and 60 to 90 weight percent of powdered carbide.

9. The method according to claim 7 in which said sintering was effected at a temperature of more than 1250° C.

10. A nitrogen oxide reducing catalyst manufactured by the process which comprises.
    a. sintering a powder compact comprising at least one powdered bonding agent selected from the group consisting of Ni, Co, Fe and an alloy mainly comprising at least two of these metals, and a carbide of at least one transition metal selected from the group consisting of Cr, Ti, Zr, and V, to obtain a sintered body; and b. subjecting said sintered mass to an acid solution to partially remove said bonding agent from the surface of said body.

11. The nitrogen oxide reducing catalyst of claim 10 wherein said powder compact comprises 10 to 40 weight percent of powdered bonding agent and 60 to 90 weight percent of powdered carbide.

12. The nitrogen oxide reducing catalyst of claim 10 wherein said sintering is effected at a temperature in excess of 1250° C.

* * * * *

UNITED STATES PATENT AND TRADEMARK OFFICE
CERTIFICATE OF CORRECTION

PATENT NO. : 4,062,807
DATED : December 13, 1977
INVENTOR(S) : Suzuki

It is certified that error appears in the above-identified patent and that said Letters Patent are hereby corrected as shown below:

Under heading "[30] Foreign Application Priority Data" insert the following --June 17, 1975 Japan ............ 50-72673--.

Signed and Sealed this

Second Day of May 1978

[SEAL]

Attest:

RUTH C. MASON
Attesting Officer

LUTRELLE F. PARKER
Acting Commissioner of Patents and Trademarks